(12) United States Patent
Furusako et al.

(10) Patent No.: US 10,081,071 B2
(45) Date of Patent: Sep. 25, 2018

(54) ARC SPOT WELDED JOINT AND MANUFACTURING METHOD THEREOF

(71) Applicant: NIPPON STEEL & SUMITOMO METAL CORPORATION, Tokyo (JP)

(72) Inventors: Seiji Furusako, Tokyo (JP); Shinji Kodama, Tokyo (JP); Yasunobu Miyazaki, Tokyo (JP); Hatsuhiko Oikawa, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 283 days.

(21) Appl. No.: 14/906,212

(22) PCT Filed: Jul. 30, 2014

(86) PCT No.: PCT/JP2014/070137
§ 371 (c)(1),
(2) Date: Jan. 19, 2016

(87) PCT Pub. No.: WO2015/016287
PCT Pub. Date: Feb. 5, 2015

(65) Prior Publication Data
US 2016/0158865 A1    Jun. 9, 2016

(30) Foreign Application Priority Data

Jul. 31, 2013   (JP) ................. 2013-159575

(51) Int. Cl.
*B23K 9/23* (2006.01)
*B23K 9/00* (2006.01)
(Continued)

(52) U.S. Cl.
CPC ............... *B23K 9/007* (2013.01); *B23K 9/23* (2013.01); *B23K 2201/18* (2013.01);
(Continued)

(58) Field of Classification Search
CPC ............ B23K 2201/18; B23K 2203/04; B23K 9/007; B23K 9/23; C22C 38/00; C22C 38/06; C22C 38/38
(Continued)

(56) References Cited

U.S. PATENT DOCUMENTS

| 2,345,037 A | 3/1944 | De Gray |
| 2,776,361 A | 1/1957 | Essig |

(Continued)

FOREIGN PATENT DOCUMENTS

| JP | 57-94473 A | 6/1982 |
| JP | 6-39542 A | 2/1994 |
| JP | 2013-10139 A | 1/2013 |

OTHER PUBLICATIONS

International Search Report, issued in PCT/JP2014/070137, dated Nov. 4, 2014.
(Continued)

*Primary Examiner* — Sang Y Paik
(74) *Attorney, Agent, or Firm* — Birch, Stewart, Kolasch & Birch, LLP (57) ABSTRACT

In an arc spot welded joint manufacturing method in which two steel sheets configured by high strength steel having a component carbon content of 0.07% by mass or greater are overlapped, and the sheets are lap welded together in a spot pattern. The method includes a first welding pass in which a second steel sheet on the lower side is melted up to a back face side, and first weld metal is formed including a first reinforcement portion, and a second welding pass in which a second weld metal including a second reinforcement portion is formed over the first weld metal, such that the heights of the first reinforcement portion or the second reinforcement portion is formed at t/5 or greater with respect (Continued)

to the sheet thickness t of the steel sheets, and the average weld bead diameter is formed at from 3t to 10t.

5 Claims, 8 Drawing Sheets

(51) Int. Cl.
  *B23K 9/007* (2006.01)
  *C22C 38/00* (2006.01)
  *C22C 38/06* (2006.01)
  *C22C 38/38* (2006.01)
  *B23K 101/18* (2006.01)
  *B23K 103/04* (2006.01)

(52) U.S. Cl.
  CPC .......... *B23K 2203/04* (2013.01); *C22C 38/00* (2013.01); *C22C 38/06* (2013.01); *C22C 38/38* (2013.01)

(58) Field of Classification Search
  USPC .................... 219/127, 136, 137 R, 137 WM
  See application file for complete search history.

(56) References Cited

U.S. PATENT DOCUMENTS

| | | | |
|---|---|---|---|
| 4,359,599 A | 11/1982 | Benner | |
| 2012/0141829 A1* | 6/2012 | Oikawa | B23K 11/115 |
| | | | 428/683 |

OTHER PUBLICATIONS

Written Opinion of the International Searching Authority, issued in PCT/JP2014/070137, dated Nov. 4, 2014.

* cited by examiner

ARC SPOT WELDED JOINT AND MANUFACTURING METHOD THEREOF

TECHNICAL FIELD

The present invention relates to an arc spot welded joint and a manufacturing method thereof.

BACKGROUND ART

Recently, for example in automotive fields, the use of high strength steel sheets is increasing, and the strength of the high strength steel sheets employed is becoming higher and higher, in order to reduce vehicle weight and improve collision safety.

When such high strength steel is employed, spot welding, primarily using resistance welding, is employed in vehicle body assembly and component attachment processes.

Since spot welding requires electrodes to be pressed from both face sides of the steel sheets, it is not applicable to members with closed cross-section structures and the like. Arc spot welding (also known as plug welding) using arc welding is therefore employed at locations where spot welding is not possible.

SUMMARY OF INVENTION

Technical Problem

The joint strength of spot welded portions is evaluated by tensile shear strength (TSS) measured by applying tensile load in a shear direction, and cross tensile strength (CTS) measured by applying tensile load in a peel direction.

Figure 6:
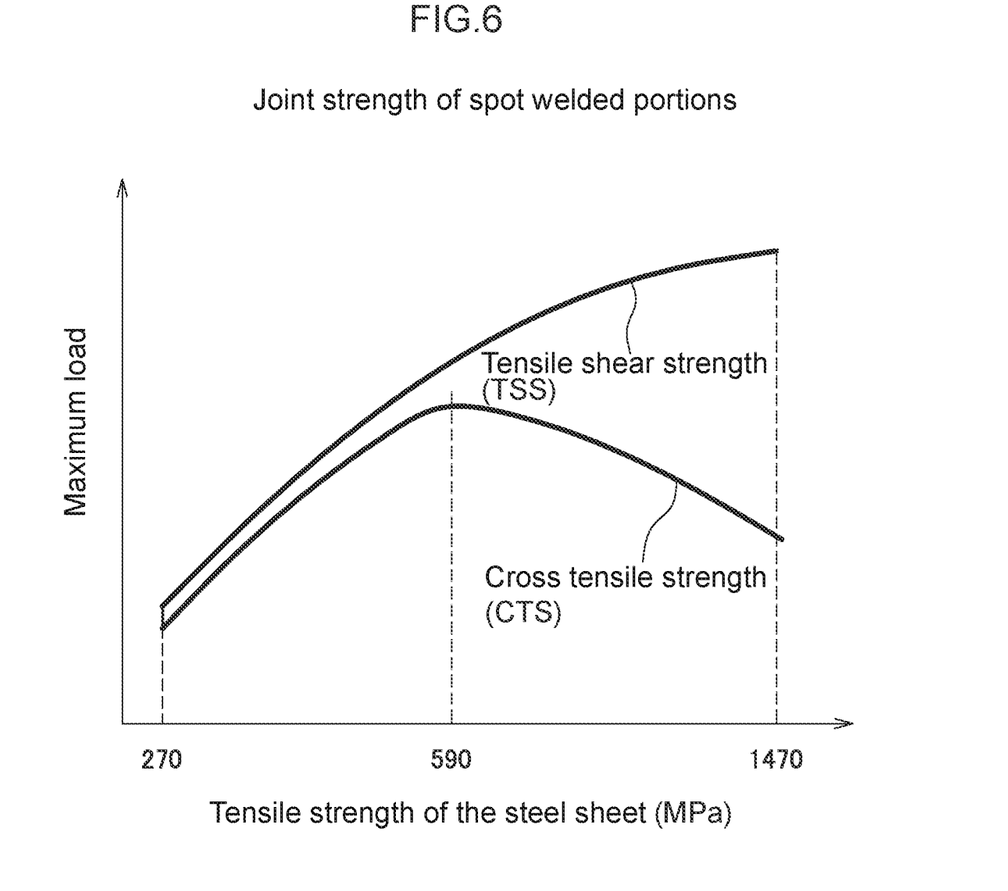
FIG. 6 is a graph illustrating relationships between the tensile strength of steel sheets and tensile shear strength (TSS) and cross tensile strength (CTS) of spot welded joints, in spot welded joints formed using high strength steel sheets.

The tensile shear strength and the cross tensile strength are known to vary in a relationship such as that illustrated in FIG. 6 accompanying an increase in the tensile strength of the steel sheet.

Namely, although the tensile shear strength increases accompanying an increase in the tensile strength of the steel sheet, the cross tensile strength becomes saturated when the steel sheet has a tensile strength of around 590 MPa, and then decreases when the tensile strength of the steel sheet becomes any greater.

In cases in which spot welding is performed on high strength steel sheets with tensile strength exceeding 590 MPa, decreases in the toughness and ductility of the nugget occur accompanying improvements in the quenchability of the base steel sheet. In cases in which a peeling load is applied, such as in cross tensile strength of a spot weld, stress concentrates more readily in edge portions of the weld metal (nugget) the greater the strength of the steel sheet. Moreover, particularly in cases employing high pressure and cases in which sputtering has occurred, the thickness of the steel sheet of the spot welded portion becomes thinner than at the periphery thereof; further increasing the stress level with respect to load application. For these reasons, in spot welding a reduction in the cross tensile strength of the welded portion arises when the strength of the steel sheet is high.

However, in arc spot welding, the steel sheet is penetrated and welded, enabling the weld metal to form a reinforcement portion, and thereby enabling a higher strength joint to be obtained than with spot welding. However, in lap welding of high strength steel sheets having a tensile strength of 980 MPa or greater, similarly to in spot welding, there is an issue of a reduction in the cross tensile strength as the tensile strength of the steel sheet increases, making a high joint strength difficult to obtain.

Regarding this issue, in Japanese Patent Application Laid-Open (JP-A) No. 2013-10139, the present inventors have previously proposed an arc spot welded joint in which overlapping high strength steel sheets are melted from a front face of one steel sheet to a back face side of the other steel sheet, an appropriate range is defined for a relationship between the bead diameters of weld beads, which are respectively formed so as to protrude out from the front face of the one steel sheet and the back face of the other steel sheet, and the sheet thickness of the steel sheet, and a relationship between the base material hardness Hv and the weld bead hardness Hv is controlled so as to be within an appropriate range. Accordingly, even with high strength steel sheets, both high cross tensile strength and tensile shear strength are achieved without a reduction in the toughness and ductility of the welded portion, so as to achieve a weld joint with excellent joint strength.

In order to apply the technology described in JP-A No. 2013-10139 to steel sheet having a high carbon content, as a result of further investigation, the present inventors encountered the issue that it is difficult to obtain a specific joint strength when a steel sheet employing high carbon steel having a carbon content of 0.3% by mass or greater is arc spot welded to a steel sheet employing high carbon steel having a carbon content of 0.07% by mass or greater.

Accordingly, an object of the present invention is to provide an arc spot welded joint with excellent strength for both tensile shear strength and cross tensile strength when arc spot welding a steel sheet employing high strength steel having a carbon content of 0.3% by mass or greater to a steel sheet employing high carbon steel having a carbon content of 0.07% by mass or greater, and a manufacturing method thereof.

Solution to Problem

In order to obtain high joint strength, and in particular high cross tensile strength, in arc spot welding, it is important to secure a specific reinforcement portion height on the front and back of the overlapped steel sheets.

From this perspective, investigation was carried out into the reasons for the difficulty in obtaining high cross tensile strength when arc spot welding a steel sheet employing high carbon steel having a carbon content of 0.3% by mass or greater to a steel sheet employing high carbon steel having a carbon content of 0.07% by mass or greater. As a result, it was discovered that an issue exists whereby weld metal is liable to sag in sheet assemblies including steel sheets employing such high carbon steels, and with the one-pass welding described in JP-A No. 2013-10139, even though the input heat amount is suppressed and a reinforcement portion of the specific height is formed on the back face side, it is still difficult to form a reinforcement portion of the specific height on the welding torch side.

In order to address this issue, welding using two passes was considered. It was confirmed that reinforcement portions of sufficient height can be formed on the front and back faces of the overlapped steel sheets even in arc spot welding in which at least one of the steel sheets is a high strength steel sheet having a carbon content exceeding 0.3% by mass if, at the first welding pass melting occurs to the back face of the steel sheet on the opposite side to the arc irradiated side out of the overlapped steel sheets, and a reinforcement portion of the specific height is formed on the back face side, and at the second pass a reinforcement portion of the specific height is formed to the front face side of the steel sheet on the arc irradiated side. The conditions required to obtain a high strength weld joint were then investigated in order to complete the present invention.

A first aspect of the present invention provides an arc spot welded joint wherein one out of an overlapped first steel sheet and second steel sheet is a high strength steel sheet having a carbon content in the steel sheet components of 0.3% by mass or greater, and the other out of the first steel sheet or the second steel sheet is a high strength steel sheet having a carbon content in the steel sheet components of 0.07% by mass or greater, the arc spot welded joint including: first weld metal that is formed from the first steel sheet side to a back face of the second steel sheet, and that includes a first reinforcement portion protruding out from the back face of the second steel sheet; and second weld metal that is formed over the first weld metal further to a front face side of the first steel sheet than the first weld metal, and that includes a second reinforcement portion protruding out from the front face of the first steel sheet, wherein the following Equation (1) and Equation (2) are satisfied $$3t \leq W \leq 10t \quad \text{Equation (1)}$$

$$h \geq t/5 \quad \text{Equation (2)}$$

wherein

W is the average value (mm) of the equivalent circle diameter of a weld bead configured by the first weld metal and the equivalent circle diameter of a weld bead configured by the second weld metal, t is the sheet thickness (mm) of either the first steel sheet or the second steel sheet (the sheet thickness (mm) of the thinner steel sheet in cases in which the sheet thickness of the first steel sheet and the sheet thickness of the second steel sheet differ from each other), and h is the lower reinforcement portion height from out of the first reinforcement portion height (mm) and the second reinforcement portion height (mm) in cases in which the sheet thickness of the first steel sheet and the sheet thickness of the second steel sheet are equal to each other (and is the height (mm) of the reinforcement portion giving the smaller sum from out of the sum of the second reinforcement portion height (mm) and the sheet thickness (mm) of the first steel sheet at a portion adjacent to the second reinforcement portion, and the sum of the first reinforcement portion height (mm) and the sheet thickness (mm) of the second steel sheet at a portion adjacent to the first reinforcement portion in cases in which the sheet thickness of the first steel sheet and the sheet thickness of the second steel sheet differ from each other).

A second aspect of the present invention provides a manufacturing method for an arc spot welded joint, the manufacturing method including: a process of overlapping a first steel sheet and a second steel sheet, of which one is a high strength steel sheet having a carbon content in the steel sheet components of 0.3% by mass or greater, and the other is a high strength steel sheet having a carbon content in the steel sheet components of 0.07% by mass or greater; a process of melting from the side of the first steel sheet on the arc irradiated side to a back face of the second steel sheet and forming a first weld metal including a first reinforcement portion protruding out from the back face of the second steel sheet, by a first time of arc welding; and a process of, after the surface of the first weld metal has solidified, melting onto the first weld metal and forming a second weld metal including a second reinforcement portion protruding out from a front face of the first steel sheet, by a second time of arc welding, wherein the following Equation (1) and Equation (2) are satisfied $$3t \leq W \leq 10t \quad \text{Equation (1)}$$

$$h \geq t/5 \quad \text{Equation (2)}$$

wherein

W is the average value (mm) of the equivalent circle diameter of a weld bead configured by the first weld metal and the equivalent circle diameter of a weld bead configured by the second weld metal, t is the sheet thickness (mm) of either the first steel sheet or the second steel sheet (the sheet thickness (mm) of the thinner steel sheet in cases in which the sheet thickness of the first steel sheet and the sheet thickness of the second steel sheet differ from each other), and h is the lower reinforcement portion height from out of the first reinforcement portion height (mm) and the second reinforcement portion height (mm) in cases in which the sheet thickness of the first steel sheet and the sheet thickness of the second steel sheet are equal to each other (and is the height (mm) of the reinforcement portion giving the smaller sum from out of the sum of the second reinforcement portion height (mm) and the sheet thickness (mm) of the first steel sheet at a portion adjacent to the second reinforcement portion, and the sum of the first reinforcement portion height (mm) and the sheet thickness (mm) of the second steel sheet at a portion adjacent to the first reinforcement portion in cases in which the sheet thickness of the first steel sheet and the sheet thickness of the second steel sheet differ from each other).

DESCRIPTION OF EMBODIMENTS

Detailed explanation follows regarding an arc spot welded joint and a manufacturing method thereof of an exemplary embodiment of the present invention.

First, explanation follows regarding a manufacturing method of an arc spot welded joint of the present exemplary embodiment, followed by explanation regarding an arc spot welded joint manufactured by the arc spot welded joint manufacturing method, and further followed by explanation regarding operation and advantageous effects of the arc spot welded joint and its manufacturing method.

Explanation follows regarding the arc spot welded joint manufacturing method of the present exemplary embodiment.

Figure 1A:
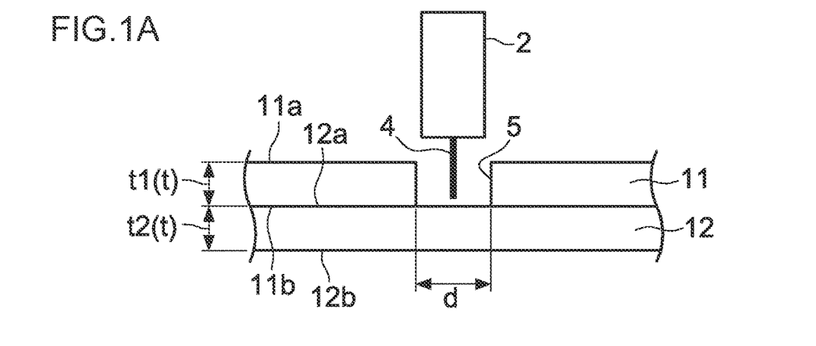
FIG. 1A is a schematic diagram illustrating a state prior to welding in an arc spot welded joint manufacturing method of an exemplary embodiment of the present invention.

First, explanation follows regarding steel sheets, these being the members to be welded that are subject to welding, and a welding torch, with reference to FIG. 1A. As illustrated in FIG. 1A, configuration is made in which steel sheets 11, 12, these being the members to be welded, are stacked, a welding torch 2 is disposed facing a through hole 5 formed in the steel sheet 11, and welding wire 4 is fed from the welding torch 2.

In the following explanation, as illustrated in FIG. 1A, the steel sheet 11 on the arc irradiated (welding torch 2) side is also referred to as the "first steel sheet 11", and the steel sheet 12 on the opposite side is also referred to as the "second steel sheet 12". The arc irradiated side face of the first steel sheet 11 is also referred to as the "front face 11*a*", and the face on the opposite side of the first steel sheet 11 is also referred to as the "back face 11*b*". The face on the first steel sheet 11 side of the second steel sheet 12 is also referred to as the "front face 12*a*", and the face on the opposite side of the second steel sheet 12 is also referred to as the "back face 12*b*".

In the overlapped first steel sheet 11 and second steel sheet 12, the front face 11*a* side of the first steel sheet 11 is also referred to as above, and the back face 12*b* side of the second steel sheet 12 is also referred to as below.

In the present exemplary embodiment, the first steel sheet 11 and the second steel sheet 12 are stacked from above to below; however, the stacking direction of the first steel sheet 11 and the second steel sheet 12 is not limited thereto. For example, the stacking direction of the first steel sheet 11 and the second steel sheet 12 may be the horizontal direction.

Members to be Welded

In the arc spot welded joint manufacturing method of the present exemplary embodiment, the two steel sheets (first steel sheet 11, second steel sheet 12) that are the members to be welded are respectively high strength steels having component carbon contents of 0.07% by mass or greater, and tensile strengths of 980 MPa or greater. At least one of the first steel sheet 11 and the second steel sheet 12 is formed from medium-high carbon steel having a component carbon content of 0.3% by mass or greater.

The use of high strength steel sheets configured by medium-high carbon steel having a component carbon content of 0.3% by mass or greater is, for example, demanded in automotive fields, where there is demand for weight reductions.

With the exception of the carbon content, the grade and components of the high strength steel employed in the first steel sheet 11 and the second steel sheet 12 are not particularly limited, and they may be any type of steel sheet, for example, dual-phase structure types (for example, structures including ferrite and martensite, structures including ferrite and bainite), strain induced transformation types (structures including ferrite and retained austenite), or fine crystal types (primarily ferrite structures).

The sheet thicknesses t1, t2 (see FIG. 1A) of the first steel sheet 11 and the second steel sheet 12 employed in the present exemplary embodiment are not particularly limited; however, the sheet thicknesses t1, t2 are preferably in a range of 0.5 mm to 3.0 mm at least at an overlapping portion. Since joint strength is heavily affected by the sheet thicknesses t1, t2 when at least one of the sheet thicknesses t1, t2 is less than 0.5 mm, in automotive fields, for example, adequate strength and rigidity cannot be secured in members including welded joints in such cases. However, in automotive fields, it is not possible to achieve both higher strength and thinner sheets (a reduction in weight) when, for example, at least one of the sheet thicknesses t1, t2 exceeds 3.0 mm.

The first steel sheet 11 and the second steel sheet 12 are not limited to the same type of steel or the same sheet thickness, and appropriate combinations may be employed as long as the carbon content in the steel sheet components satisfies the above conditions and arc spot welding is possible.

Moreover, it is sufficient that the shapes of the first steel sheet 11 and the second steel sheet 12 are sheet shaped at least at the overlapped portions. Accordingly, the first steel sheet 11 and the second steel sheet 12 of the present exemplary embodiment encompass items that are not entirely sheets, such as pressed articles that have been formed into a specific shape from a steel sheet. There is also no limitation to overlapping separate steel sheets, and single steel sheets formed into specific shapes, such as a tube shape with overlapping end portions, are also encompassed.

Overlapped Portion Configuration

As illustrated in FIG. 1A, the first steel sheet 11 and the second steel sheet 12 are overlapped with the back face 11*b* of the first steel sheet 11 and the front face 12*a* of the second steel sheet 12 abutting each other.

In the present exemplary embodiment, the first steel sheet 11 that is irradiated by the arc from the welding torch 2 is formed in advance with the through hole 5 penetrating from the front face 11*a* to the back face 11*b* at the welding location.

The through hole 5 is not absolutely necessary; however, the through hole 5 is preferably formed to the welding location when the sheet thickness t1 of the first steel sheet 11 is 1.2 mm or greater. If a through hole is not formed when the sheet thickness t1 of the first steel sheet 11 is 1.2 mm or greater, it is necessary to increase the welding heat input amount in order to penetrate the first steel sheet 11. There are accordingly concerns of burn-through occurring if the current and voltage fluctuate. Namely, this is because the appropriate heat input range in which a specific bead diameter and reinforcement height are secured, and burn-through does not occur, sometimes becomes narrower.

If the sheet thickness t1 of the first steel sheet 11 is less than 1.2 mm, the first steel sheet 11 does not require a through hole since the arc easily penetrates the first steel sheet 11. However, in cases in which further suppression of the welding heat input amount is desired, a through hole may be formed even when the sheet thickness t1 of the first steel sheet 11 is less than 1.2 mm.

Welding Process

First, in the arc spot welded joint manufacturing method of the present exemplary embodiment, as illustrated in FIG. 1A, the first steel sheet 11 and the second steel sheet 12, these being the members to be welded, are overlapped and set in the welding position.

The consumable electrode type welding torch 2 for gas metal arc welding is disposed facing the front face 11a of the first steel sheet 11 that has been set in the welding position, and gas metal arc welding is performed in a spot pattern at welding locations of the overlapped portion of the first steel sheet 11 and the second steel sheet 12, thereby joining the first steel sheet 11 and the second steel sheet 12 together.

Figure 1B:
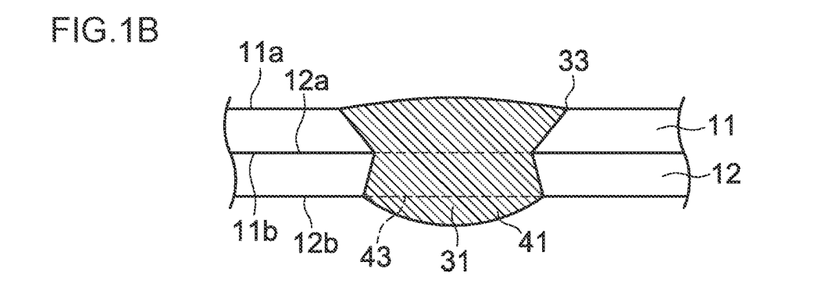
FIG. 1B is a schematic diagram illustrating a state after a first welding pass in an arc spot welded joint manufacturing method of an exemplary embodiment of the present invention.

This is performed by splitting the arc spot welding process into two welding passes. First, as illustrated in FIG. 1B, in the initial welding pass (first welding pass), a first reinforcement portion 41 is formed on the back face 12b side of the second steel sheet 12. At the next welding pass (second welding pass), a second reinforcement portion 42 is formed on the front face 11a side of the first steel sheet 11.

Specifically, as illustrated in FIG. 1A, in the first welding pass, the welding wire 4 is fed toward the through hole 5 from the welding torch 2, aiming at the position of the through hole 5 formed to the first steel sheet 11, and an arc is generated from the leading end of the welding wire 4 as it is fed out, melting through to the back face 12b of the second steel sheet 12. The weld metal is then cooled and solidified, thereby forming first weld metal 31 that reaches from the back face 12b of the second steel sheet 12 to the front face 11a side of the first steel sheet 11 as illustrated in FIG. 1B. The first weld metal 31 includes the first reinforcement portion 41 (see the portion at the lower side of the intermittent line 43 in FIG. 1B) protruding outward from the back face 12b of the second steel sheet 12.

Figure 1C:
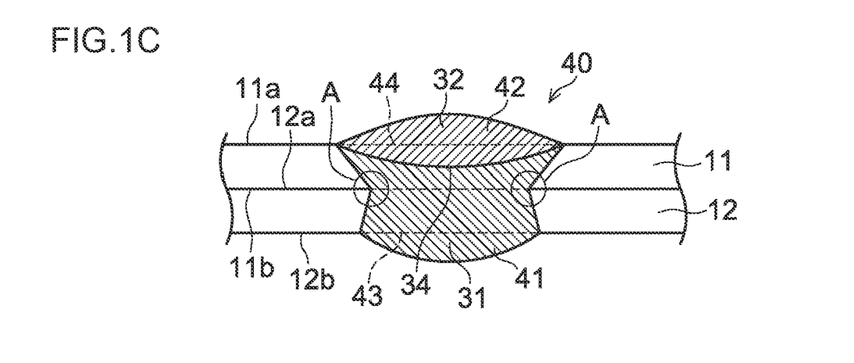
FIG. 1C is a schematic diagram illustrating a state (weld joint) after a second welding pass in an arc spot welded joint manufacturing method of an exemplary embodiment of the present invention.
Figure 1D:
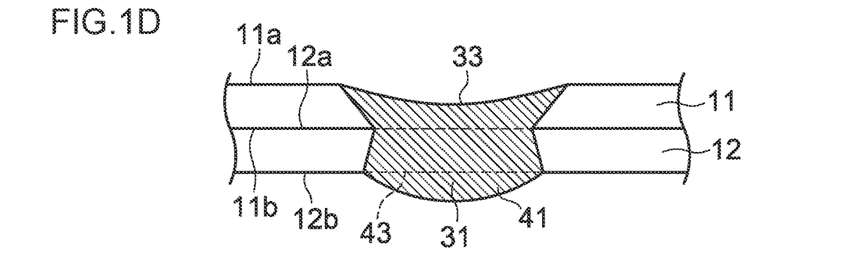
FIG. 1D is a schematic diagram illustrating another state after a first welding pass in an arc spot welded joint manufacturing method of an exemplary embodiment of the present invention.

As long as an upper face lowermost end 33 of the first weld metal 31 (see FIG. 1B and FIG. 1D) is above the back face 11b of the first steel sheet 11, there is no particular issue if the upper face lowermost end 33 of the first weld metal 31 is below the front face 11a of the first steel sheet 11, as illustrated in FIG. 1D.

In cases in which the welding heat input amount of the subsequent second welding pass is high, as illustrated in FIG. 1B, it is desirable for the upper face lowermost end 33 of the first weld metal 31 to be formed up to the front face 11a of the first steel sheet 11, or up to further to the upper side than the front face 11a. As illustrated in FIG. 1D, when the upper face lowermost end 33 of the first weld metal 31 is further to the lower side than the front face 11a of the first steel sheet 11, the amount of second weld metal 32 melted in the second welding pass increases, and the welding heat input amount increases. If, as a result, the welding heat input amount of the second welding pass becomes excessively large, there is a concern of the first weld metal 31 remelting through as far as the back face 12b side of the second steel sheet 12, and dripping away during the second welding pass. The welding heat input in the second welding pass can accordingly be suppressed by forming the upper face lowermost end 33 of the first weld metal 31 at, or further to the upper side than, the front face 11a of the first steel sheet 11.

The second welding pass is performed after the first weld metal 31 has solidified. In the second welding pass, as illustrated in FIG. 1C, the second weld metal 32 including the second reinforcement portion 42 (see the portion to the upper side of the intermittent line 44 in FIG. 1C) protruding outward from the front face 11a of the first steel sheet 11 is formed over the first weld metal 31.

Welding Conditions

The current and voltage conditions for the arc spot welding are not particularly limited, and appropriate conditions may be appropriately employed according to the sheet thicknesses t1, t2 of the first steel sheet 11 and the second steel sheet 12 to be welded.

The type of shield gas employed during the first and second welding passes is likewise not particularly limited, and an example thereof is a gas mixture of ordinary Ar, and $CO_2$ at 30% by volume or less. Since dripping away of the bead can be particularly suppressed when the amount of $CO_2$ gas in the mixture is from 2 to 15% by volume, welding is preferably performed under such a shield gas condition in the first welding pass.

The components, diameter, and the like of the welding wire employed in arc spot welding are not particularly limited. For example, known welding wire, such as the welding wire specified in JIS Z 3312 and JIS Z 3313, may be selected and employed so as to form weld metal with a strength corresponding to the required joint strength.

Weld Joint

As illustrated in FIG. 1C, in this two-pass welding, the two high strength steel sheets 11 and 12 are overlapped and spot welded, obtaining an arc spot welded joint 40 joined by the first weld metal 31 and the second weld metal 32.

Figure 2:
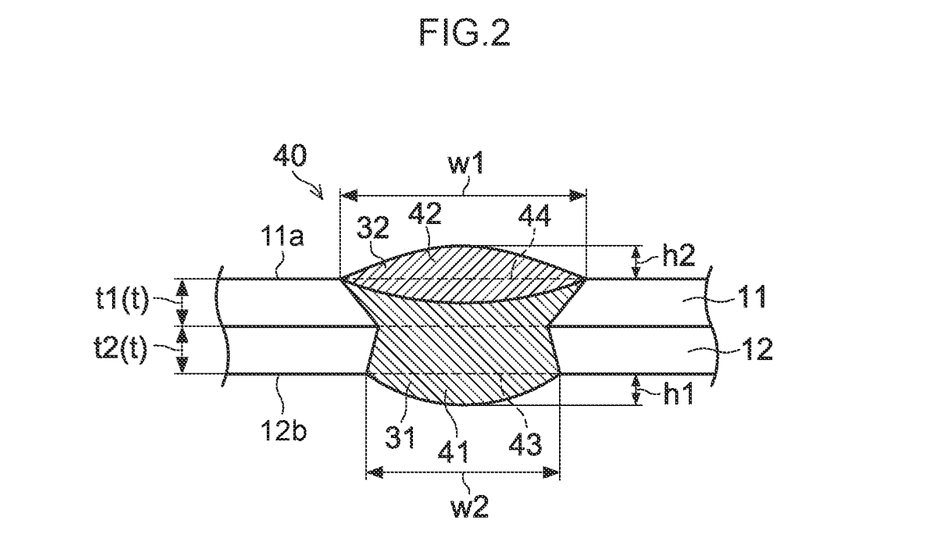
FIG. 2 is a schematic diagram illustrating dimensional relationships of FIG. 1C.

As illustrated in FIG. 2, in the weld joint 40, an average value W of a bead diameter W1 of the first steel sheet 11 and a bead diameter W2 of the second steel sheet 12 (also referred to below as the "average weld bead diameter") is formed in a range of from 3t (mm) to 10t (mm) with respect to the sheet thickness t (mm).

Note that when the sheet thicknesses t1, t2 of the first steel sheet 11 and the second steel sheet 12 are different to each other, the sheet thickness t is the sheet thickness of the thinner steel sheet.

Here, the bead diameters W1, W2 are respectively the equivalent circle diameter of the weld bead formed to the front face 11a of the first steel sheet 11 by the first weld metal 31, and the equivalent circle diameter of the weld bead formed to the back face 12b of the second steel sheet 12 by the second weld metal 32. Note that the equivalent circle diameter of the weld bead refers to the diameter of a circle with the same area as the area of the weld bead formed at the position of the front face 11a of the first steel sheet 11 or the back face 12b of the second steel sheet 12.

As illustrated in FIG. 2, in the weld joint 40, a height h1 of the first reinforcement portion 41 formed to the back face 12b of the second steel sheet 12, and a height h2 of the second reinforcement portion 42 formed to the front face 11a of the first steel sheet 11 are preferably both formed at t/5 (mm) or greater with respect to the sheet thickness t (mm) of the steel sheet.

In the present exemplary embodiment, the reinforcement height h is employed as an index for measuring the strength of the weld joint. Note that the value of the lower of the heights h1, h2 of the first reinforcement portion 41 and the second reinforcement portion 42 is taken as the reinforcement height h in cases in which the sheet thicknesses t1, t2 of the first steel sheet 11 and the second steel sheet 12 are the same as each other. In cases in which the sheet thicknesses t1, t2 of the first steel sheet 11 and the second steel sheet 12 differ from each other, the height (mm) of the reinforcement portion with the smaller sum, from out of the sum (h2+t1) of the height h2 (mm) of the second reinforcement portion 42 and the sheet thickness t1 (mm) of the first steel sheet 11 at a portion adjacent to the second reinforcement portion 42 or the sum (h1+t2) of the height h1 (mm) of the first reinforcement portion 41 and the sheet thickness t2 (mm) of the second steel sheet 12 at a portion adjacent to the first reinforcement portion 41, is taken as the reinforcement height h.

This is since during cross tensile strength testing, in cases in which the sheet thicknesses t1, t2 of the first steel sheet 11 and the second steel sheet 12 are the same as each other, failure occurs on the side of the steel sheet with the lower reinforcement portion height. In cases in which the sheet thicknesses t1, t2 of the first steel sheet 11 and the second steel sheet 12 are different to each other, failure almost always occurs (the cross tensile strength of the joint is determined) on the side of the steel sheet with the smaller sum from out of the sum (h2+t1) of the height h2 (mm) of the second reinforcement portion 42 and the sheet thickness t1 (mm) of the first steel sheet 11 at the portion adjacent to the second reinforcement portion 42, and the sum (h1+t2) of the height h1 (mm) of the first reinforcement portion 41 and the sheet thickness t2 (mm) of the second steel sheet 12 at the portion adjacent to the first reinforcement portion 41.

The reinforcement height h (mm) is formed so as to be t/5 (mm) or greater with respect to the sheet thickness t (mm). Note that in cases in which the sheet thickness t1 of the first steel sheet 11 and the sheet thickness t2 of the second steel sheet 12 are equal to each other, the sheet thickness t refers to this sheet thickness. In cases in which the sheet thickness t1 of the first steel sheet 11 and the sheet thickness t2 of the second steel sheet 12 are different to each other, the sheet thickness t refers to the sheet thickness of the thinner of the steel sheets.

Figure 4:
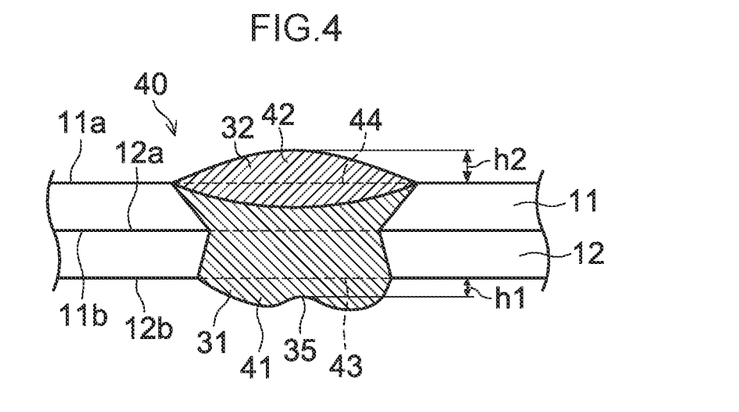
FIG. 4 is a schematic diagram illustrating an arc spot welded joint in which a recess is present in a reinforcement portion in an exemplary embodiment of the present invention.

Note that in the arc spot welding of the present exemplary embodiment, the second reinforcement portion 42 formed to the front face 11a of the overlapped first steel sheet 11 and the first reinforcement portion 41 formed to the back face 12b of the second steel sheet 12 are not always entirely protrusions such as those illustrated in FIG. 1C, and sometimes a recess 35 is formed, as illustrated in FIG. 4. Even when a recess 35 is present in the first reinforcement portion 41 or the second reinforcement portion 42, the required strength of the weld joint 40 can still be secured as long as the bottom of the recess 35 is positioned further to the outside than the back face 12b of the second steel sheet 12 or the front face 11a of the first steel sheet 11.

Accordingly, in the present exemplary embodiment, the height h1 of the first reinforcement portion 41 is the maximum height of the first reinforcement portion 41 when there is no recess (see FIG. 1C), and is the height to the bottom of the recess 35 when a recess 35 is present (see FIG. 4). Similar applies to the height h2 of the second reinforcement portion 42.

Explanation follows regarding operation and advantageous effects of the arc spot welded joint 40 formed in this manner, and of the manufacturing method thereof.

Operation and Advantageous Effects of Manufacturing Method

In the arc spot welded joint manufacturing method of the present exemplary embodiment, weld metal is formed from the front face 11a of the first steel sheet 11 to the back face 12b of the second steel sheet 12 by two welding passes, thereby suppressing the welding heat input of a single welding pass compared to cases in which similar weld metal is formed by a single welding pass, thereby suppressing burn-through and excessive welding deformation of the first weld metal 31.

In particular, the first reinforcement portion 41 at the back face 12b of the second steel sheet 12 is formed by the first welding pass, and the second reinforcement portion 42 at the front face 11a of the first steel sheet 11 is formed by the second welding pass, thereby enabling stable formation of the first reinforcement portion 41 and the second reinforcement portion 42 with the reinforcement height h (mm) of the specific height (t/5 (mm)) or greater, and of the first weld metal 31 and second weld metal 32 with the average weld bead diameter W in the specific range, while suppressing the welding heat input when forming the first reinforcement portion 41 and the second reinforcement portion 42, and preventing burn-through and the like of the first weld metal 31.

The through hole 5 is formed to the first steel sheet 11 on the arc irradiated side, thereby suppressing the welding heat input during the first welding pass, preventing or suppressing burn-through of the first weld metal 31 during the first welding pass, and stably forming the first reinforcement portion with the specific height and the first weld metal 31 with the specific bead diameter.

By suppressing the welding heat input amount during the first welding pass and the second welding pass in this manner, the arc spot welded joint 40 of an arc spot welded high strength steel sheet having a component carbon content of 0.3% by mass or greater and a high strength steel sheet having a component carbon content of 0.07% by mass or greater, that is liable to burn-through of the weld metal, can secure the reinforcement height h (mm) and average weld bead diameter W (mm) within the specific ranges, and has excellent tensile shear strength and cross tensile strength.

The ratio (d/t1) of the diameter d (mm) of the through hole 5 of the first steel sheet 11 to the sheet thickness t1 of the first steel sheet 11 is preferably from 1 to 10. This thereby enables stable arc spot welding to be performed in which the bead penetrates through to the back face 12b of the second steel sheet 12.

Namely, if d/t1 exceeds 10, it becomes necessary to swing the welding torch 2 with a large amplitude in order to weld the hole edges of the through hole 5 sufficiently. There are resulting concerns of an increase in welding time, and of obvious welding deformation due to increasing the welding heat input. If the welding torch 2 is not swung, there are concerns of unmelted hole edges remaining, reducing the cross tensile strength of the weld joint 40. Note that if the value of d/t1 is below 1, the advantageous effects of forming the through hole 5 (suppressing the welding heat input) become insufficient.

A wait time between finishing the first welding pass (after turning off the arc of the first welding pass) and beginning the second welding pass (starting the arc of the second welding pass) is preferably 1 second or greater, and more preferably 2 seconds or greater. The first weld metal 31 solidifies either completely or partially due to including the wait time, thus enabling stable formation of the second weld metal 32 without burn-through of the first weld metal 31.

Note that adjusting the wait time enables the effects of the heat of the second welding pass on the first weld metal 31 to be regulated. This will be explained later.

Weld Joint Operation and Advantageous Effects

The average weld bead diameter W of the weld joint 40 is from 3t to less than 10t, thereby enabling stable manufacture with a specific joint strength.

The first steel sheet 11 and the second steel sheet 12 configuring the weld joint 40 are both high strength steel sheets having a carbon content of 0.07% by mass or greater, and at least one is a high strength steel sheet having a carbon content of 0.3% by mass or greater. Accordingly, if at least one of the first steel sheet 11 and the second steel sheet 12 has a tensile strength of 980 MPa or greater, there is a reduction in cross tensile strength of the weld joint 40 accompanying the increase in tensile strength, which has to be offset by an increase in the bead diameter. A small bead accordingly results when the average weld bead diameter W is less than 3t, and a joint strength appropriate to the strength of the first steel sheet 11 and the second steel sheet 12 cannot be obtained. If the average weld bead diameter W has a size exceeding 10t, it becomes necessary to swing the welding torch 2, increasing the welding time, and there are concerns of the first weld metal 31 dripping away, and of welding deformation becoming obvious, due to the increase in the welding heat input amount.

Joint strength is sufficient as long as the reinforcement height h (mm) of the weld joint 40 is t/5 (mm) or greater with respect to the sheet thickness t (mm) of the steel sheet. If the reinforcement height h (mm) is below t/5, the height of the reinforcement portion is insufficient, and sufficient joint strength cannot be obtained.

Structural Changes in the First Weld Metal

In the arc spot welded joint manufacturing method of the present exemplary embodiment, one second or greater elapses after forming the first weld metal 31, before beginning formation of the second weld metal 32. However, adjusting the start time of the second welding pass enables the structure of the first weld metal 31 to be changed.

Portions A where the first weld metal 31 formed by arc spot welding contacts the back face 11b of the first steel sheet 11 (see FIG. 1C) are portions where concentrated stress acts during tensile testing, in particular during cross tensile strength testing.

A high strength steel sheet having a carbon content of 0.3% by mass or greater and with a tensile strength of 980 MPa or greater includes a large amount of quenching elements, such as silicon (Si) and manganese (Mn), in addition to carbon (C). Accordingly, in cases in which the welding wire employed also has a high proportion of these quenching element components, sometimes martensite is formed in the weld metal and the heat affected zone during the cooling process after welding, reducing toughness.

It is accordingly conceivable that the toughness of the portions A where the first weld metal 31 contacts the back face 11b of the first steel sheet 11 might also be reduced, with cracking liable to occur in cross tensile strength testing.

When welding is performed in two passes, the first weld metal 31 formed by the first welding pass, and the heat affected zone in the vicinity of the back face 11b of the first steel sheet 11, are reheated or remelted by the heat of the second welding pass. This action can be utilized to slow the cooling speed of the first weld metal 31 and suppress the generation of martensite, and to temper martensite formed in the first weld metal 31 and in the heat affected zone in the vicinity of the back face 11b of the first steel sheet 11.

The action of the heat of the second welding pass imparts different effects on the first weld metal 31 depending on the length of the wait time between the first welding pass and the second welding pass, namely the start time of the formation of the second weld metal 32.

In cases in which formation of the second weld metal 32 is started after the first weld metal 31 and the heat affected zone in the vicinity of the back face 11b of the first steel sheet 11 have cooled to the Ms temperature or below and transformed into martensite, this results in the martensite being tempered.

In cases in which formation of the second weld metal 32 is started when in a high temperature state prior to the first weld metal 31 and the heat affected zone in the vicinity of the back face 11b of the first steel sheet 11 transforming into martensite, the generation of martensite can be suppressed and bainite transformation promoted.

Configuring the portions A, where the first welded metal 31 contacts the overlapping positions of the back face 11b of the first steel sheet 11 and the front face 12a of the second steel sheet 12 and the heat affected zones in the vicinity of the overlapping positions, with a structure including a large amount of tempered martensite and/or bainite improves toughness, and, in particular, enables higher strength to be obtained in cross tensile strength testing.

As illustrated in FIG. 1C, in order to obtain the benefits of this operation, it is necessary to form a molten lowermost end 34 of the second weld metal 32 at a position at a separation further to the upper side than the back face 11b of the first steel sheet 11.

Accordingly, as illustrated in FIG. 1B, the upper face lowermost end 33 of the first weld metal 31 is formed at a position further to the front face 11a side than a position at ½ the sheet thickness from the back face 11b in the sheet thickness direction of the first steel sheet 11. The lowermost end 34 of the second weld metal 32 is formed at a position above the back face 11b of the first steel sheet 11 in the sheet thickness direction of the first steel sheet 11, and preferably further to the front face 11a side than a position at ⅓ the sheet thickness from the back face 11b.

Figure 5:
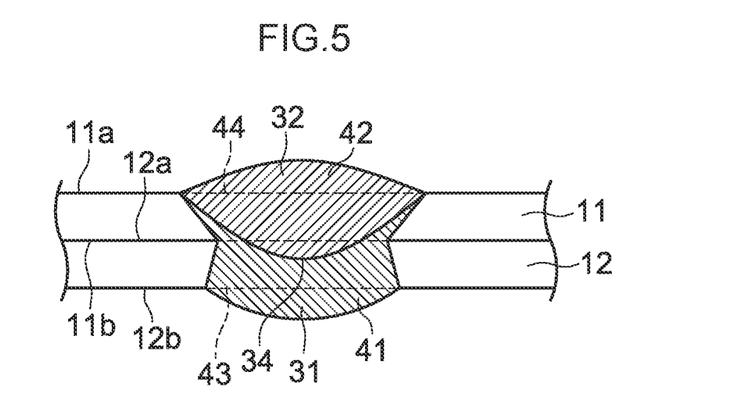
FIG. 5 is a schematic diagram illustrating an arc spot welded joint of a comparative example.

If the molten lowermost end 34 of the second weld metal 32 is further to the lower side than the back face 11b of the first steel sheet 11, as illustrated in FIG. 5, the portions of the first weld metal 31 in the vicinity of the overlapped positions of the back face 11b of the first steel sheet 11 and the front face 12a of the second steel sheet 12, and the heat affected zones in the vicinity of the overlapped positions, are heated to the austentite phase region or higher during the second welding pass, generating a hard structure, such that the above advantageous effect cannot be obtained.

Figure 3:
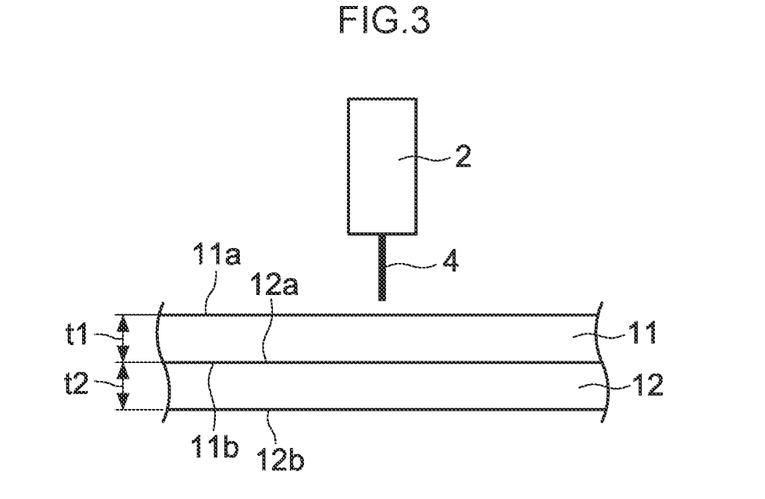
FIG. 3 is a schematic diagram illustrating a state prior to welding steel sheets without a through hole in an arc spot welded joint manufacturing method of an exemplary embodiment of the present invention.

In the arc spot welded joint manufacturing method of the present exemplary embodiment, the first steel sheet 11 is formed with the through hole 5; however, as illustrated in FIG. 3, the arc spot welded joint manufacturing method may be applied to a first steel sheet 11 and second steel sheet 12 in which the through hole 5 is not formed.

In such cases, the basic welding procedure and respective welding pass conditions are the same as in cases in which the through hole 5 is formed. However, in order to melt the first steel sheet 11, it is necessary to weld with a higher heat input amount in the first welding pass than in configurations formed with the through hole 5.

Accordingly, when the stacked thickness of the first steel sheet 11 and the second steel sheet 12 (t1+t2) is thick, the heat input amount required to melt through to the back face 12b of the second steel sheet 12 increases, and burn-through of the first weld metal 31 sometimes occurs when attempting to secure sufficient height of the first reinforcement portion 41.

Accordingly, cases in which the first steel sheet 11 is not formed with a through hole are preferably implemented when there is a comparatively thin first steel sheet 11 and second steel sheet 12. Investigation by the inventors confirmed that welding could be performed without burn-through within a certain range of heat input conditions, as long as the sum of the sheet thickness t1 of the first steel sheet 11 and the sheet thickness t2 of the second steel sheet 12 when overlapped is 2.5 mm or less.

Other

In the present exemplary embodiment, welding is performed with the wait time interposed between the first welding pass and the second welding pass. The welding time is therefore longer than when welding in a single pass. However, in automotive body assembly, each welding member has plural arc spot weld points, and a reduction in time can be achieved by increasing the number of welding robots according to the number of weld points.

As described above, in the present exemplary embodiment, arc spot welding is performed on the overlapped first steel sheet 11 and the second steel sheet 12, of which one is configured by high strength steel having a component carbon content of 0.3% by mass or greater, and the other is configured by high strength steel having a component carbon content of 0.07% by mass or greater, to produce a member with a high strength weld joint portion. Examples confirming the implementability and advantageous effects of the present invention are given below.

Test Method

High strength steel sheets with the compositions shown in Table 1 were prepared, with sheet thicknesses of 1.0 mm or 1.8 mm, and tensile strength of 1890 MPa or 2250 MPa. Test sheet members were cut out from these steel sheets, and arc spot welding was performed on the sheet members to produce test samples for tensile testing. The shield gas employed in each case was a gas mixture of 15% $CO_2$ gas by volume, with Ar gas making up the remainder.

Figure 7:
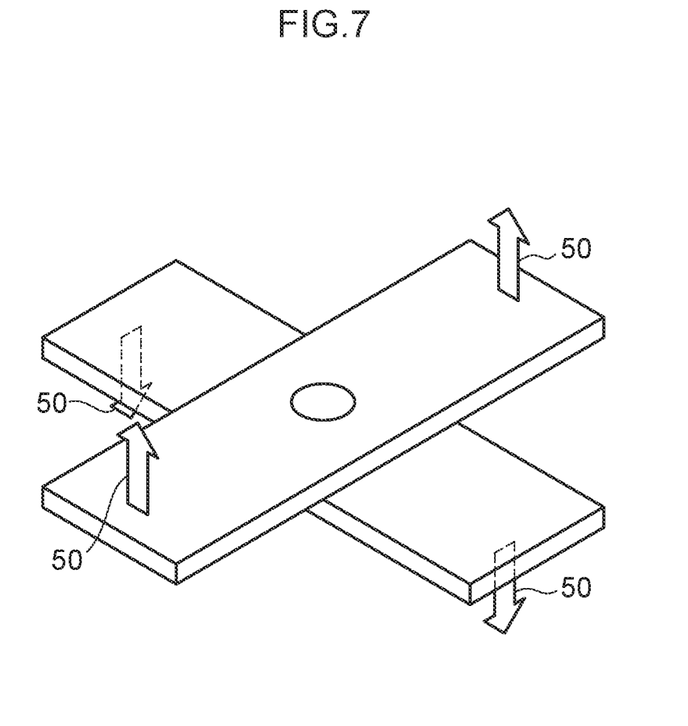
FIG. 7 is a schematic diagram illustrating the shape of a test sample employed for measuring cross tensile strength.

Test samples for cross tensile testing were produced based on the cross tensile testing method for spot welded joints (JIS Z3137), and as illustrated in FIG. 7, respective sheet members were overlapped in a cross shape, and the test samples were lap welded using a two pass arc spot welding method under the conditions set out in Table 2 to produce the cross tensile test samples. When this was performed, the YGW17 listed in JIS Z3312 was employed as the welding wire. Note that in cases in which a through hole diameter is given in Table 2, a through hole of the given diameter value was formed at the welding position in the upper side test sample.

Figure 8:
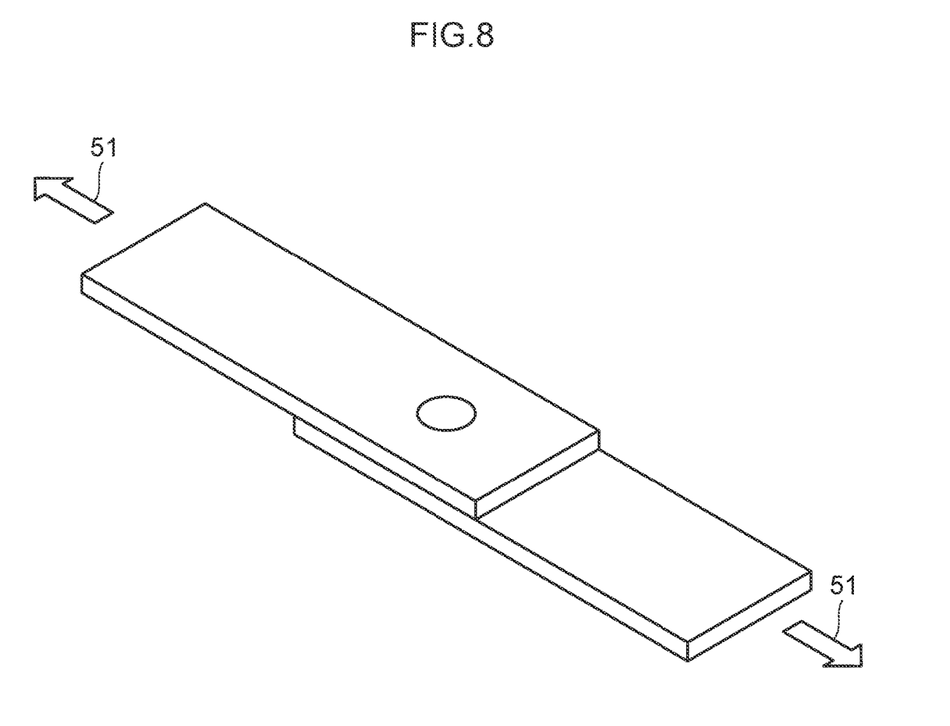
FIG. 8 is a schematic diagram illustrating the shape of a test sample employed for measuring tensile shear strength.

Test samples for tensile shear testing were similarly produced based on the tensile shear testing method for spot welded joints (JIS Z3136), and as illustrated in FIG. 8, respective test samples were overlapped parallel to each other, and the test samples were welded together using an arc spot welding method under the respective conditions set out in Table 2 to produce the tensile shear test samples. Note that in cases in which a through hole diameter is given in Table 2, a through hole of the given diameter value was formed at the welding position in the upper side test sample.

Cross tensile test and tensile shear test samples were also produced by combining and overlapping test sheet members similarly produced using the same types of steel, welding the respective sheet members together using a conventional one pass spot weld method under the respective conditions set out in Table 2.

In the test samples produced by arc spot welding as described above, the shape of the weld bead was first visually confirmed, and the weld bead diameter and reinforcement height were measured.

The bead diameters W1, W2 of the weld beads on the front face 11a side of the first steel sheet 11 and the back face 12b side of the second steel sheet 12 were measured, and the average value thereof was taken as the average weld bead diameter W, shown in Table 2. Note that the bead diameters W1, W2 are measured as the equivalent circle diameters of the weld beads in plan view.

For the height of the reinforcement portions, first, the test samples were sectioned in the direction giving substantially the maximum bead diameter in plan view, and photographs were taken of the cross-sections illustrated in FIG. 2 and FIG. 4. Then, determination was made as to whether or not a recess 35 was present in each reinforcement portion using an image analysis device. In cases in which no recess was present, the maximum height of the reinforcement portion was found as the height of the reinforcement portion, and in cases in which the recess 35 was present, the height to the bottom of the recess 35 was found as the height of the reinforcement portion.

The reinforcement height h (mm) refers to the lower of the heights h1 (mm), h2 (mm) of the first reinforcement portion 41 and the second reinforcement portion 42 in cases in which the sheet thicknesses t1, t2 of the first steel sheet 11 and the second steel sheet 12 are the same as each other, and, from out of the sum (h2+t1) of the height h2 (mm) of the second reinforcement portion 42 and the sheet thickness t1 (mm) of the first steel sheet 11 at the portion adjacent to the second reinforcement portion 42, and the sum (h1+t2) of the height h1 (mm) of the first reinforcement portion 41 and the sheet thickness t2 (mm) of the second steel sheet 12 at the portion adjacent to the first reinforcement portion 41, the reinforcement height h refers to the height (mm) of the reinforcement portion with the smaller sum in cases in which the sheet thicknesses t1, t2 of the first steel sheet 11 and the second steel sheet 12 differ from each other.

The lowermost end 34 of the second weld metal 32 is measured from a cross-section image with respect to the back face 11b of the first steel sheet 11.

The upper end of the first weld metal 31 is measured from a cross-section image of the test sample sectioned along the direction giving the maximum bead diameter of the weld bead in plan view after completion of the first welding pass.

The welding heat input (J) of the first pass and the second pass is found using the voltage value, current value, and welding time (arc time) applied to the welding torch during each weld.

Next, cross tensile testing was performed based on JIS Z3137 to measure the cross tensile strength (CTS) of the cross tensile test samples. Here, cross tensile testing was performed by applying load in the peel direction, namely upward on the upper side test sample, and downward on the lower side test sample, as illustrated by the arrows 50 in FIG. 7, in a peeling apart direction. The cross tensile strength (CTS) was measured, and the results are shown in Table 2.

Tensile shear testing was performed based on JIS Z3136 to measure the tensile shear strength (TSS) of the tensile shear test samples. Here, tensile shear testing was performed by applying load in a shear direction, namely in mutual shear directions along the left-right direction of the respective test samples as illustrated by the arrows 51 in FIG. 8. The tensile shear strength (TSS) was measured, and the results are shown in Table 2 below.

Test Results

Results of testing performed according to the test methods described above are shown in Table 2. Of the results shown in Table 2, test numbers 3, 4, 7, 8, 11, and 12 are Examples, and test numbers 1, 2, 5, 6, 9, and 10 are Comparative Examples.

As illustrated in Table 2, for the present Examples, arc spot welding was performed with two welding passes, such that the reinforcement height h of the weld metal and the average weld bead diameter W satisfied the ranges specified in the present exemplary embodiment. As a result, it could be confirmed that high strength steel sheets having a carbon content of 0.3% by mass or greater can be employed to obtain weld joints excelling in both cross tensile strength and tensile shear strength.

For the Comparative Examples, arc spot welding was performed such that the reinforcement height h and the average weld bead diameter W did not satisfy the ranges specified in the present exemplary embodiment. As a result, weld joints with sufficient cross tensile strength and tensile shear strength could not be obtained even when two welding passes were performed, such as with test numbers 2, 6, and 8.

TABLE 1

| Steel sheet no. | Sheet thickness t (mm) | Strength (MPa) | Chemical composition (% by mass) | | | | | | | | | | |
|---|---|---|---|---|---|---|---|---|---|---|---|---|---|
| | | | C | Si | Mn | P | S | Al | N | Cr | V | B | Mg |
| A | 1.8 | 2250 | 0.43 | 0.22 | 1.0 | 0.013 | 0.005 | 0.035 | 0.0060 | — | — | — | — |
| B | 1.0 | 1890 | 0.33 | 0.30 | 2.5 | 0.015 | 0.002 | 0.030 | 0.0043 | 0.3 | 0.05 | 0.0015 | 0.003 |

TABLE 2

| Test No. | First steel sheet | Second steel sheet | Sheet thickness t (mm) | Reinforcement height h (mm) | h/t | Average bead diameter W (mm) | W/t | Through hole diameter d (mm) | d/t | Welding heat input at first pass (J) | Arc stoppage time between passes (s) | Welding heat input at second pass (J) | Position of upper end of first weld metal | Position of lower end of second weld metal | TSS (kN) | CTS (kN) | Remarks |
|---|---|---|---|---|---|---|---|---|---|---|---|---|---|---|---|---|---|
| 1 | A | A | 1.8 | 0.2 | 0.11 | 8.0 | 4.4 | 5 | 2.8 | 6375 | — | — | — | — | 19 | 4.2 | Comparative example (1 pass welding) |
| 2 | A | A | 1.8 | 0.3 | 0.18 | 8.5 | 4.7 | 5 | 2.8 | 6375 | 2.0 | 715 | above | above | 19 | 4.5 | Comparative Example |
| 3 | A | A | 1.8 | 1.3 | 0.72 | 9.5 | 5.3 | 5 | 2.8 | 6375 | 2.0 | 3375 | above | above | 22 | 8.2 | Example |
| 4 | A | A | 1.8 | 1.8 | 1.00 | 10.0 | 5.6 | 5 | 2.8 | 5625 | 2.0 | 4500 | above | above | 22 | 9.5 | Example |
| 5 | A | A | 1.8 | 0.3 | 0.18 | 4.5 | 2.5 | 5 | 2.8 | 2250 | 2.0 | 1125 | above | above | 16 | 3.6 | Comparative Example |
| 6 | A | A | 1.8 | 0.3 | 0.17 | 9.0 | 5.0 | 5 | 2.8 | 6375 | 0.5 | 6375 | above | below | 20 | 4.4 | Comparative Example (burn-through occurred) |
| 7 | A | A | 1.8 | 1.8 | 1.00 | 10.0 | 5.6 | 5 | 2.8 | 6375 | 2.0 | 6375 | above | below | 22 | 8.5 | Example |
| 8 | A | A | 1.8 | 1.0 | 0.56 | 8.4 | 4.7 | 5 | 2.8 | 6375 | 2.0 | 3375 | above | above | 21 | 7.6 | Example |
| 9 | A | A | 1.8 | 0.3 | 0.17 | 10.5 | 5.8 | 20 | 11.1 | 6375 | 2.0 | 4500 | above | above | 18 | 3.2 | Comparative Example (hole edges unmelted) |
| 10 | B | B | 1.0 | 0.1 | 0.10 | 7.0 | 7.0 | 3 | 3.0 | 4050 | — | — | — | — | 9.5 | 2.8 | Comparative Example (1 pass welding) |
| 11 | B | B | 1.0 | 0.3 | 0.33 | 8.0 | 8.0 | 3 | 3.0 | 3375 | 2.0 | 715 | above | above | 11 | 4.5 | Example |
| 12 | B | B | 1.0 | 1.2 | 1.20 | 8.5 | 8.5 | No through hole | — | 3375 | 2.0 | 3375 | above | below | 12 | 6.3 | Example |

Position of upper end of first weld metal indicates above or below ½ the first steel sheet. Position of lower end of second weld metal indicates above or below the back face of the first steel sheet.

The weld joint and the manufacturing method thereof of the present exemplary embodiment enable manufacture of a welded structural body with both high cross tensile strength and high tensile shear strength, while suppressing burn-through and securing good ease of welding when arc spot welding automotive vehicle bodies, components, and the like configured from high strength steel sheet, of which one has a component carbon content of 0.3% by mass or greater, and the other has a component carbon content of 0.07% by mass or greater. This thereby enables sufficient benefits, such as greater fuel efficiency and a reduction in carbon dioxide gas ($CO_2$) emissions accompanying a reduction in overall vehicle body weight, and improvements in collision safety, to be gained by employing high strength steel sheets in automotive fields and the like.

The entirety of the disclosure of Japanese Patent Application No. 2013-159575, filed on Jul. 31, 2013, is incorporated by reference in the present specification.

All cited documents, patent applications and technical standards mentioned in the present specification are incorporated by reference in the present specification to the same extent as if the individual cited document, patent application, or technical standard was specifically and individually indicated to be incorporated by reference.

The invention claimed is:

1. A method of manufacturing an arc spot welded joint, the method comprising:

a process of overlapping a first steel sheet and a second steel sheet, of which one is a high strength steel sheet having a carbon content in a steel sheet component of 0.3% by mass or greater, and another is a high strength steel sheet having a carbon content in a steel sheet component of 0.07% by mass or greater;

a process of melting from a side of the first steel sheet on an arc irradiated side to a back face of the second steel sheet and forming a first weld metal including a first reinforcement portion protruding from the back face of the second steel sheet, by a first arc welding; and a process of, after a surface of the first weld metal has solidified, melting onto the first weld metal and forming a second weld metal including a second reinforcement portion protruding from a front face of the first steel sheet, by a second arc welding, wherein the following Equation (1) and Equation (2) are satisfied:

$$3t \leq W \leq 10t \quad \text{Equation (1)}$$

$$h \geq t/5 \quad \text{Equation (2)}$$

wherein:

W is an average value (mm) of an equivalent circle diameter of a weld bead configured by the first weld metal and an equivalent circle diameter of a weld bead configured by the second weld metal;

t is a sheet thickness (mm) of either the first steel sheet or the second steel sheet, being the sheet thickness (mm) of the thinner of the steel sheets in cases in which the sheet thickness of the first steel sheet and the sheet thickness of the second steel sheet are different;

h is a lower reinforcement portion height out of a first reinforcement portion height (mm) and a second reinforcement portion height (mm) in cases in which the sheet thickness of the first steel sheet and the sheet thickness of the second steel sheet are equal, and is a height (mm) of the reinforcement portion giving a smaller sum out of a sum of the second reinforcement portion height (mm) and the sheet thickness (mm) of the first steel sheet at a portion adjacent to the second reinforcement portion, and a sum of the first reinforcement portion height (mm) and the sheet thickness (mm) of the second steel sheet at a portion adjacent to the first reinforcement portion in cases in which the sheet thickness of the first steel sheet and the sheet thickness of the second steel sheet are different;

a lowermost end of the second weld metal is formed further toward a side of the front face of the first steel sheet than a back face of the first steel sheet, by the second arc welding; and the forming of the second weld metal is started after 2 seconds or longer has elapsed from after ending the forming of the first weld metal and after the first weld metal and the heat affected zone in the vicinity of the back face of the first steel sheet have cooled to a Ms temperature or below.

2. The arc spot welded joint manufacturing method of claim 1, wherein an upper face lowermost end of the first weld metal is formed at a position in a sheet thickness direction of the first steel sheet further toward a side of the front face than a sheet thickness center position of the first steel sheet, by the first arc welding.

3. The arc spot welded joint manufacturing method of claim 2, wherein the upper face lowermost end of the first weld metal is formed either at the front face of the first steel sheet, or at a position further toward an outer side than the front face of the first steel sheet, by the first arc welding.

4. The arc spot welded joint manufacturing method of claim 1, wherein a through hole having a diameter of from 1 times to 10 times the sheet thickness of the first steel sheet is formed through the first steel sheet, and the first weld metal is formed at a position including the through hole.

5. The arc spot welded joint manufacturing method of claim 1, wherein a heat input amount of the second arc welding is equal to or less than a heat input amount of the first arc welding.

* * * * *